July 31, 1923.
W. DREDGE
BAKER'S OVEN
Filed Jan. 3, 1921
1,463,616
2 Sheets-Sheet 1
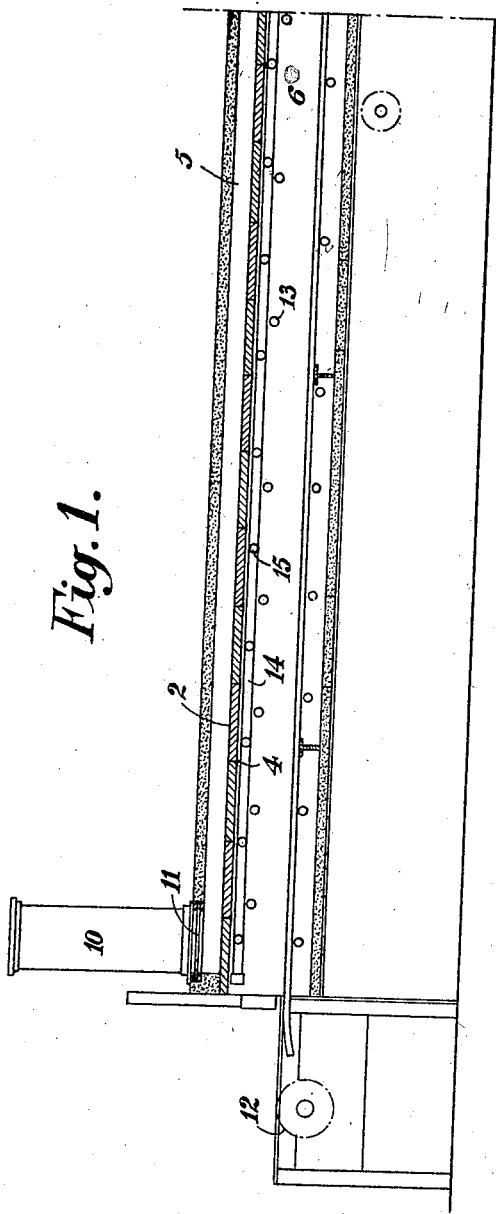
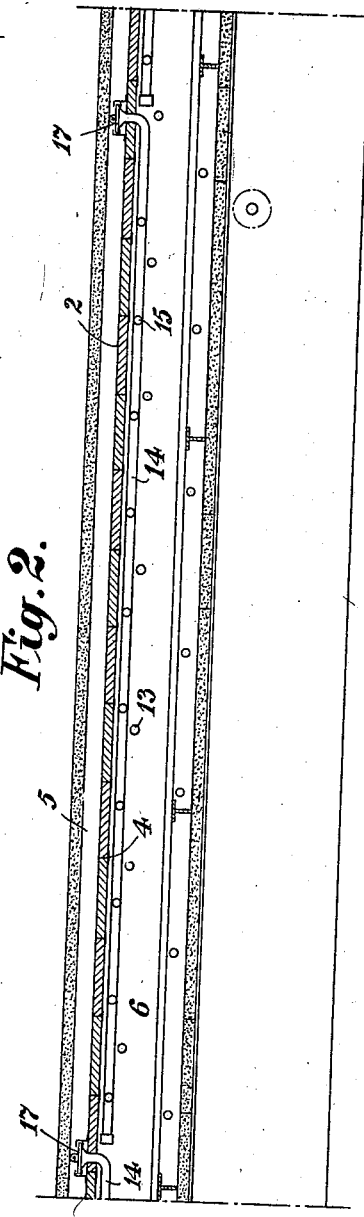

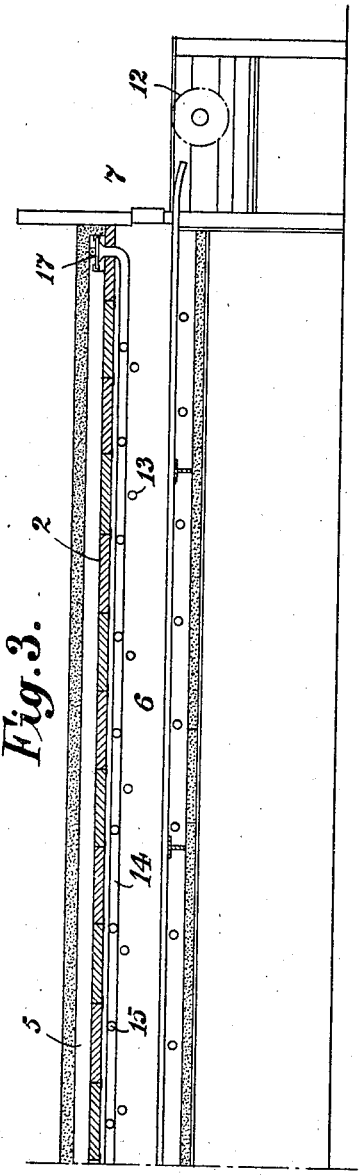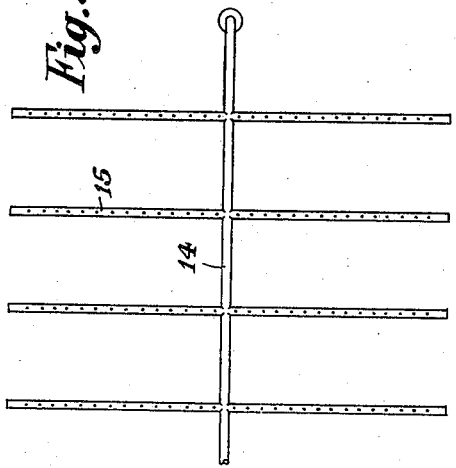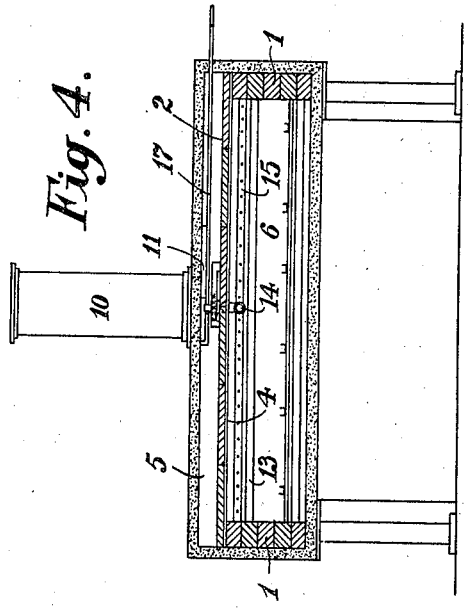

Patented July 31, 1923.

1,463,616

UNITED STATES PATENT OFFICE.

WILLIAM DREDGE, OF MANCHESTER, ENGLAND.

BAKER'S OVEN.

Application filed January 3, 1921. Serial No. 434,697.

(GRANTED UNDER THE PROVISIONS OF THE ACT OF MARCH 3, 1921, 41 STAT. L., 1313.)

*To all whom it may concern:*

Be it known that I, WILLIAM DREDGE, subject of the King of Great Britain, residing in Manchester, in the county of Lancaster and Kingdom of England, have invented certain new and useful Improvements in or Relating to Bakers' Ovens (for which I have filed application in England November 28, 1919, Patent No. 159586), of which the following is a specification.

This invention relates to bakers' ovens, and has reference to the type wherein the baking chamber is heated internally, that is to say one in which the heat may be generated in, or passed through the baking chamber, as distinguished from the type in which the chamber is heated externally by flues surrounding it, so that the goods are baked by radiation of the heat from the external flues.

My specification Serial No. 354363 describes an improvement in this type of oven, such improvements being characterized by the feature that a flue or collecting chamber controlled by a damper is provided which extends longitudinally of the roof or side walls or floor thereof, and in that the interior of the oven chamber communicates with this flue or collecting chamber by means of a multitude of perforations spread over a wide area and extending throughout the whole length of the oven chamber, or a part of the length thereof, so that the hot vapors or combustion products can be drawn off in a body over a wide area of the oven, instead of such withdrawal being concentrated or focussed at one particular point or points, and so that the hot vapors can be drawn off in a body as they are created, or removed gradually or retained, or retained at one part of the baking but removing at another part.

Now the object of the present invention is to provide an improvement in or modification of the arrangement described and claimed in my specification aforesaid.

The said improvement or modification is characterized by this, that instead of providing perforations in the inner lining of the roof or in the side walls or floor, I provide in the interior of the baking chamber, a tube or tubes having perforations or apertures through which the hot vapors and combustion products can be removed by suction either by the draught induced by an uptake, or by the draught induced by a fan and either removed as they are created, or removed gradually, or retained, or retained at the one stage of the baking, but removed at another stage, thus rendering the oven applicable for baking different kinds of foods, and producing efficient baking conditions.

The said improvement or modifications will be understood from the following description, reference being had to the accompanying drawings, in which:—

Figure 1 is a sectional elevation of about one half the length of a bakers' oven, Figures 2 and 3 are similar views of the remainder thereof, Figure 4 is a cross section through the oven, Figure 5 is a plan view of the perforated tubes by which the hot vapors and combustion products can be removed.

Referring to these drawings, 1 are the fire brick walls of the oven, and 2 the roof which is built of tiles supported by metallic members 4 of T shape in cross section, supported at the ends by the fire brick walls 1. Above these tiles is the flue or collecting chamber 5 extending longitudinally the whole length and width of the baking chamber or substantially so, and 7 is the delivery end of the baking chamber 6. The collecting chamber 5 communicates with the uptake 10, and 11 is the damper regulating the draught of the uptake, 12 are the pulleys round which pass the endless travelling chains which support trays or receptacles to receive the goods to be baked, and 13 indicate the transversely disposed burner tubes. Passing longitudinally through the baking chamber 6 is a pipe or pipes 14 having a plurality of perforated pipes 15 projecting therefrom and extending across the baking chamber 6 at intervals apart, so that the hot vapors and combustion products can be drawn through these perforations in the branch pipes into the main longitudinal pipe 14 and delivered into the flue or collecting chamber 5 and thence to the uptake 10 by the draught of the said uptake, or by means of a fan. In the drawing these pipes are located immediately below the roof of the baking chamber, but they could be located in proximity to the side walls or floor. The perforated pipes 15 extend across the baking chamber 6 at those parts from which it is desired to remove the hot vapors or combustion products, while at those parts where it is desired to retain the said hot vapors or combustion products, the said perforated branch pipes are omitted, or thrown out of operation. The perforated pipe 15 may be arranged in groups, each group being connected to a separate valve controlled main pipe 14 leading to the collecting chamber 5 or uptake, so that the hot vapors and combustion products, can be drawn off in a body as they are created, or removed gradually or retained, or retained at one stage of the baking but removed at another stage. In the particular arrangement shown in the drawing there are three longitudinal pipes 14 each provided with branch pipes 15, one extending from the delivery end 7 about one third of the length of the baking chamber, another extending for about one third of the length of the baking chamber at or about mid-length thereof, and another extending from the feeding end of the baking chamber for about one third of its length, and each length of pipe has perforated branch pipes extending across the baking chamber. One end of each of the longitudinal pipes 14 communicates with the flue or collecting chamber 5 at different points, and the ends of the respective pipes are provided with valves or dampers 17 operated externally of the oven so as to enable any one or more of the delivery orifices of the pipes to be closed, when it is desired to retain the hot vapors at one part of the baking chamber but to enable them to be freely removed at others. The perforations in the respective pipes constitute the only communication between the baking chamber 6 and the collecting chamber 5.

The improvement provides a substitute for the perforated tiles described in my prior specification, but the result obtained is substantially the same, that is to say it provides a multitude of perforations extending over a wide area throughout the whole length of the baking chamber or a part of the length thereof and means for regulating the outflow of the superfluous vapors and combustion products through these perforations, so that the hot vapors and combustion products can be drawn off in a body over a large area instead of such withdrawal being concentrated or focussed at one particular point or points, and the oven is rendered applicable for baking different kinds of goods such as bread, biscuits and the like.

In another arrangement, apertures are provided in the interior of the baking chamber communicating with the flue or collecting chamber 5, and in each aperture there is mounted a rotary suction fan, these fans being arranged to withdraw the hot vapors and combustion products from those parts of the baking chamber from which it is desired to remove them, and deliver such steam or heat into the collecting chamber 5 from whence they are discharged to the uptake. The flue or collecting chamber 5 by reason of the hot vapors and combustion products passing therethrough forms a heating jacket.

I declare that what I claim is:—

1. A baker's oven of the type referred to, comprising a casing composed of non-conducting walls, an oven chamber having means for heating the same internally, a flue extending longitudinally of the said chamber and a tube or tubes in the interior of the baking chamber having perforations or apertures through which the hot vapors or combustion products can be removed throughout the whole length of such chamber or a part of the length thereof.

2. A baker's oven of the type wherein the oven chamber is heated internally, comprising a casing composed of non-conducting walls, a flue extending longitudinally of the baking chamber, an uptake at the end of the oven structure with which the said flue communicates, a longitudinal pipe or pipes leading to the collecting chamber or direct to the uptake, and having a plurality of perforated pipes projecting therefrom and extending across the baking chamber at intervals apart, and dampers, the parts being so arranged that the hot vapors and combustion products can be drawn out of the baking chamber at those parts where the perforated pipes are located, while at those parts where it is desired to retain the hot vapors, the said perforated pipes are omitted or thrown out of operation.

3. A baker's oven of the type referred to, comprising a casing composed of non-conducting walls, a flue extending longitudinally of the baking chamber, an uptake at one end of the oven structure, perforated pipes extending across the interior of the baking chamber and arranged in groups located in a different position in the length of the baking chamber, each group being connected to a separate valve controlled main pipe leading to the collecting chamber or uptake, so as to enable any of the groups to be thrown into or out of operation, whereby the hot vapors can be drawn off in a body as they are created, or removed gradually or retained, or retained at the initial stage of the baking, but removed at the final stage or vice versa.

In witness whereof, I have hereunto signed my name this 7 day of Dec'r 1920, in the presence of two subscribing witnesses.

WILLIAM DREDGE.

Witnesses:
G. C. DYMOND,
JOHN McLACHLAN.